United States Patent
Kim et al.

(10) Patent No.: US 12,336,021 B2
(45) Date of Patent: Jun. 17, 2025

(54) COMMUNICATION NODE, COMMUNICATION SYSTEM AND OPERATING METHOD THEREOF

(71) Applicants: SOLiD, INC., Seongnam-si (KR); INDUSTRY-UNIVERSITY COOPERATION FOUNDATION KOREA AEROSPACE UNIVERSITY, Goyang-si (KR)

(72) Inventors: HyunChae Kim, Seoul (KR); WooSik Moon, Seongnam-si (KR); NagWon Kwon, Yongin-si (KR); Jihoon Choi, Seoul (KR)

(73) Assignees: SOLiD, INC., Seongnam-si (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 406 days.

(21) Appl. No.: 17/776,844

(22) PCT Filed: Nov. 20, 2020

(86) PCT No.: PCT/KR2020/016476
§ 371 (c)(1),
(2) Date: May 13, 2022

(87) PCT Pub. No.: WO2021/107513
PCT Pub. Date: Jun. 3, 2021

(65) Prior Publication Data
US 2022/0394783 A1    Dec. 8, 2022

(30) Foreign Application Priority Data

Nov. 25, 2019 (KR) .................. 10-2019-0152580
Nov. 19, 2020 (KR) .................. 10-2020-0156047

(51) Int. Cl.
*H04W 74/08* (2024.01)

(52) U.S. Cl.
CPC .................. *H04W 74/0891* (2013.01)

(58) Field of Classification Search
CPC .......... H04W 74/0891; H04W 56/001; H04W 74/0833; H04L 27/2671; H04L 27/2675; H04L 27/2662
See application file for complete search history.

(56) References Cited

U.S. PATENT DOCUMENTS

2007/0121706 A1    5/2007 Nakamura et al.
2008/0219190 A1*   9/2008 Haartsen .............. H04B 7/2681
                                                            370/280

(Continued)

FOREIGN PATENT DOCUMENTS

CN    106604310         *  4/2017
KR    10-2011-0046939 A    5/2011
KR    10-2016-0140018 A   12/2016

OTHER PUBLICATIONS

Extended European Search Report dated Dec. 6, 2023 in European Application No. 20893415.8.

(Continued)

*Primary Examiner* — Sudesh M Patidar
(74) *Attorney, Agent, or Firm* — Sughrue Mion, PLLC

(57) ABSTRACT

Provided are a method of operating a communication system using physical layer division, the method comprises extracting an initial random access signal from an uplink signal, in a first physical layer of a first communication node of the communication system reducing a data amount of the extracted initial random access signal in the first physical layer and calculating a time synchronization error using the initial random access signal with a reduced amount of data, (Continued)

in a second physical layer of a second communication node of the communication system.

11 Claims, 7 Drawing Sheets

(56) References Cited

U.S. PATENT DOCUMENTS

| | | | |
|---|---|---|---|
| 2013/0094523 A1 | 4/2013 | Shen et al. | |
| 2016/0315674 A1* | 10/2016 | Li | H04L 25/03343 |
| 2016/0352461 A1* | 12/2016 | Choi | H04N 21/44008 |
| 2017/0223744 A1* | 8/2017 | Qian | H04W 74/0833 |
| 2018/0077661 A1* | 3/2018 | Zhang | H04L 5/0048 |
| 2018/0331775 A1* | 11/2018 | Lin | H04J 13/0062 |
| 2018/0343633 A1* | 11/2018 | Uchino | H04L 5/0055 |
| 2019/0116064 A1* | 4/2019 | Kubo | H04B 7/0413 |
| 2019/0289497 A1 | 9/2019 | Rajagopal | |
| 2019/0320464 A1* | 10/2019 | Shen | H04W 74/0833 |
| 2020/0322992 A1* | 10/2020 | Isogawa | H04W 74/0891 |
| 2022/0407593 A1* | 12/2022 | Moon | H04L 1/1861 |

OTHER PUBLICATIONS

International Search Report of PCT/KR2020/016476 dated Feb. 23, 2021 [PCT/ISA/210].
Written Opinion of PCT/KR2020/016476 dated Feb. 23, 2021 [PCT/ISA/237].

* cited by examiner

COMMUNICATION NODE, COMMUNICATION SYSTEM AND OPERATING METHOD THEREOF

CROSS REFERENCE TO RELATED APPLICATIONS

This application is a National Stage of International Application No. PCT/KR2020/016476, filed Nov. 20, 2020, claiming priority to Korean Patent Application No. 10-2019-0152580, filed Nov. 25, 2019 and Korean Patent Application No. 10-2020-0156047, filed Nov. 19, 2020.

TECHNICAL FIELD

The present invention relates to a communication node, a communication system, and a method of operating the same, and more particularly, to a communication node capable of receiving an initial random access signal with a reduced amount of data extracted from an uplink signal in a first physical layer from another communication node and calculating a time synchronization error using the initial random access signal with the reduced amount of data in a second physical layer, a communication system, and a method of operating the same.

BACKGROUND ART

In the existing mobile communication system, in order to provide a communication service to a base station shadow area such as a building or subway, a distributed antenna structure is constructed with a remote wireless device, and the remote wireless device and a digital device of a base station are connected to each other using a matching unit.

In particular, when implementing a distributed antenna system in a 5G mobile communication system, there is a limit to installing an additional dedicated cable for 5G communication, so the cable installed for 3G/4G communication is often shared. However, there is a problem that the cable installed for 3G/4G communication has insufficient capacity to support the maximum transmission speed defined in the 5G standard specification.

DESCRIPTION OF EMBODIMENTS

Technical Problem

The present invention provides a communication node capable of receiving an initial random access signal with a reduced amount of data extracted from an uplink signal in a first physical layer from another communication node and calculating a time synchronization error using an initial random access signal with a reduced amount of data in a second physical layer, a communication system, and a method of operating the same.

Solution to Problem

According to an aspect of an embodiment, a method of operating a communication system using physical layer division may comprise extracting an initial random access signal from an uplink signal, in a first physical layer of a first communication node of the communication system, reducing a data amount of the extracted initial random access signal in the first physical layer and calculating a time synchronization error using the initial random access signal with a reduced amount of data, in a second physical layer of a second communication node of the communication system.

According to an aspect of an embodiment, the first physical layer may be a lower physical layer according to the physical layer division, and the second physical layer may be an upper physical layer according to the physical layer division.

According to an aspect of an embodiment, the initial random access signal may be a physical random access channel (PRACH) signal.

According to an aspect of an embodiment, the first communication node may be a remote unit, and the second communication node may be a distributed unit.

According to an aspect of an embodiment, the extracting of the initial random access signal from the uplink signal may comprise shifting a frequency band of the uplink signal to a baseband and extracting the initial random access signal by low-pass filtering the frequency band-shifted uplink signal.

According to an aspect of an embodiment, the reducing of the data amount of the extracted initial random access signal may comprise downsampling the extracted initial random access signal to reduce the data amount of the initial random access signal.

According to an aspect of an embodiment, the method may further comprise transmitting a combined signal generated by combining the uplink signal through data channel processing of the first physical layer in the first communication node and the initial random access signal with the reduced amount of data to the second communication node, and the calculating of the time synchronization error may comprise separating the initial random access signal with the reduced amount of data from the combined signal and calculating a time synchronization error using the separated initial random access signal with the reduced amount of data.

According to an aspect of an embodiment, the calculating of the time synchronization error may comprise calculating a first time offset using the initial random access signal with the reduced amount of data, restoring an initial random access signal with an original amount of data by using the initial random access signal with the reduced amount of data and calculating a second time offset using the first time offset and the restored initial random access signal.

According to an aspect of an embodiment, the calculating of the first time offset may comprise calculating a correlation value between the initial random access signal with the reduced amount of data and a plurality of random access sequences, searching for a random access sequence having a maximum correlation value from among the plurality of random access sequences and calculating the first time offset using the searched random access sequence having the maximum correlation value.

According to an aspect of an embodiment, the restoring of the initial random access signal with the original amount of data may comprise upsampling the initial random access signal with the reduced amount of data and interpolating the upsampled initial random access signal.

According to an aspect of an embodiment, the interpolating of the upsampled initial random access signal may comprise low-pass filtering the upsampled initial random access signal.

According to an aspect of an embodiment, the calculating of the second time offset using the first time offset and the restored initial random access signal may comprise calculating the second time offset using the first time offset, the restored initial random access signal, and the random access sequence having the maximum correlation value.

According to an aspect of an embodiment, the calculating of the second time offset using the first time offset, the restored initial random access signal, and the random access sequence having the maximum correlation value may comprise calculating the second time offset based on a point at which a correlation value of the restored initial random access signal and the random access sequence having the maximum correlation value becomes maximum within a reference range from the first time offset.

According to an aspect of an embodiment, a communication node may include a memory and a processor, wherein the communication node, in a first physical layer of another communication node, may receive an initial random access signal with a reduced amount of data extracted from an uplink signal from the other communication node, and calculate a time synchronization error using the initial random access signal with the reduced amount of data in a second physical layer of the communication node.

According to an aspect of an embodiment, a communication system using physical layer division may comprise a first communication node configured to extract an initial random access signal from an uplink signal and reducing a data amount of the extracted initial random access signal in a first physical layer and a second communication node configured to calculate a time synchronization error using the initial random access signal with a reduced amount of data in a second physical layer.

Advantageous Effects of Disclosure

A method and a device according to an embodiment of the present invention have an advantage in that the capacity of data (e.g., a physical random access channel (PRACH) signal) required to be transmitted between communication nodes may be reduced in a process of calculating a time synchronization error, and at the same time, because the time synchronization error is estimated in an upper physical layer, information for calculating the time synchronization error (e.g., information about random access sequences, etc.) does not need to be shared with a lower physical layer.

BRIEF DESCRIPTION OF DRAWINGS

A brief description of each drawing is provided to more fully understand drawings recited in the detailed description of the present invention.

MODE OF DISCLOSURE

Figure 1:
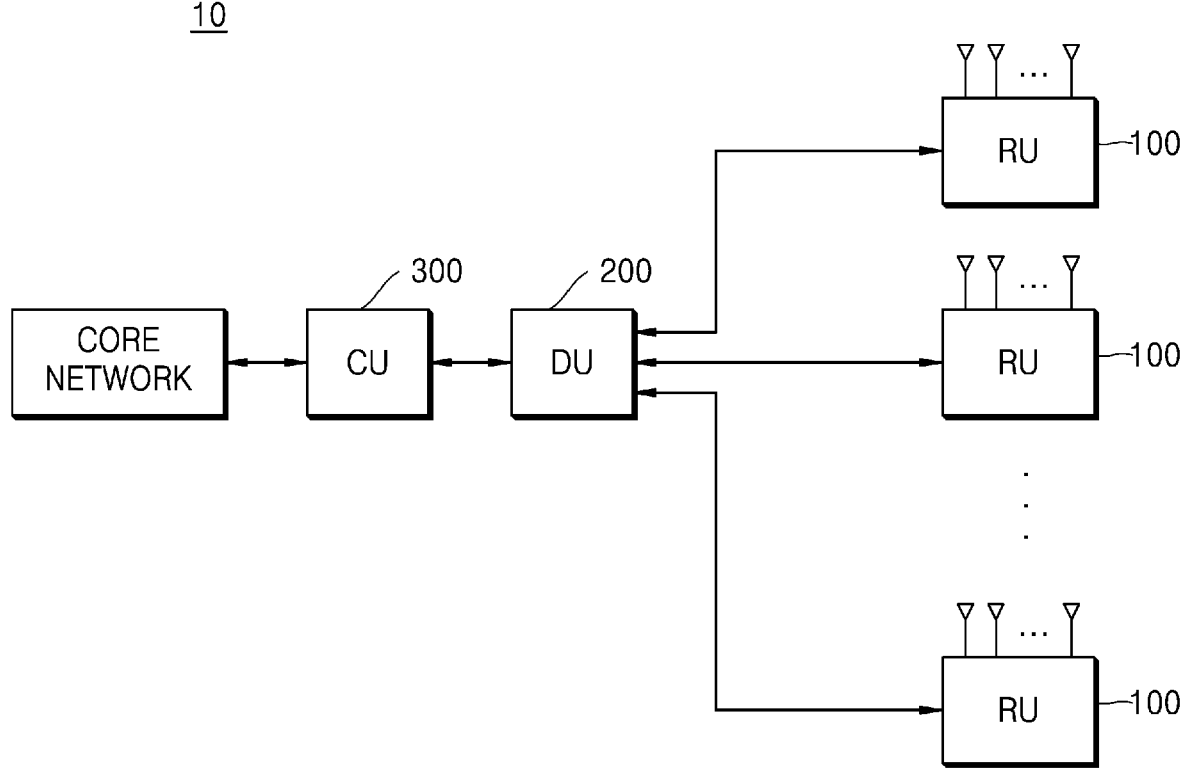
FIG. 1 is a conceptual diagram of a communication system according to an embodiment of the present invention.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system according to an embodiment of the present invention.

Referring to FIG. 1, a communication system 10 according to an embodiment of the present invention may include a plurality of remote units (RUs) 100, a distributed unit (DU) 200, a centralized unit (CU) 300, and a core network.

The plurality of remote units 100 may be connected to the distributed unit 200 and distributed to transmit and receive signals transmitted/received from a base station at locations distributed in various shaded areas or dense areas.

The communication system 10 according to an embodiment of the present invention may use physical layer division between the plurality of remote units 100 and the distributed unit 200. The plurality of remote units 100 may process a lower physical layer (Low-PHY), and the distributed unit 200 may process an upper physical layer (High-PHY).

According to an embodiment, the plurality of remote units 100 and the distributed unit 200 may be connected to each other through various communication media such as optical cables, high-speed cables, or microwave cables.

According to an embodiment, the plurality of remote units 100 and the distributed unit 200 may conform to various fronthaul communication standards. For example, an Ethernet-based Common Public Radio Interface (eCPRI), which is a 5G fronthaul interface standard, may be used between the plurality of remote units 100 and the distributed unit 200.

The base station may be divided into the distributed unit 200 and the centralized unit 300, wherein the distributed unit 200 and the centralized unit 300 may separate functions in various forms according to various function split options (e.g., 3GPP TR38.801 standard, etc.).

According to an embodiment, the distributed unit 200 and the centralized unit 300 may divide and process layers into RRC, PDCP, High-RLC, Low-RLC, High-MAC, Low-MAC, and High-PHY.

FIG. 1 illustrates a structure in which the base station is divided into the distributed unit 200 and the centralized unit 300, but is not limited thereto, and various modifications are possible.

The centralized unit 300 may directly work with a core network, and may interface between the core network and the base station.

Detailed structures and operations of the remote unit 100 and the distributed unit 200 will be described later with reference to FIGS. 2 to 7.

Figure 2:
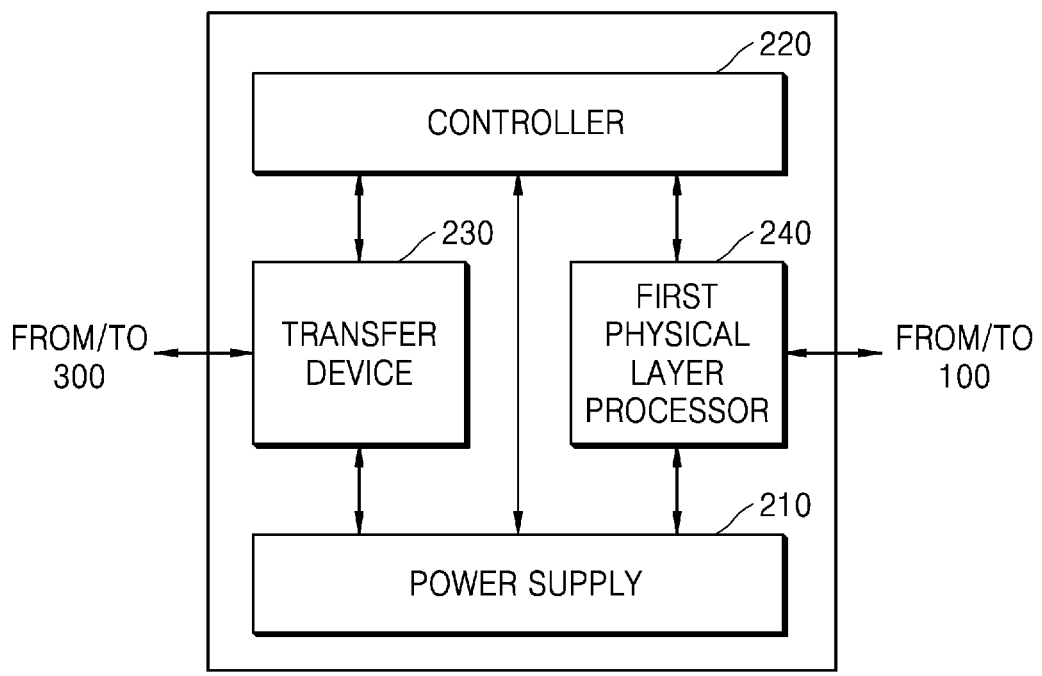
FIG. 2 is a block diagram of a distributed unit shown in FIG. 1.

FIG. 2 is a block diagram of the distributed unit shown in FIG. 1.

Referring to FIGS. 1 and 2, the distributed unit 200 may include a power supply 210, a controller 220, a transfer device 230, and a first physical layer processor 240.

The power supply 210 may supply power to components (e.g., 220 to 240) in the distributed unit 200.

The controller 220 may control all operations of the components (e.g., 210, 230, and 240) in the distributed unit 200.

The transfer device 230 may interface communication between the distributed unit 200 and the centralized unit 300, and may perform signal processing necessary for signal transmission/reception with the centralized unit 300.

The first physical layer processor 240 may process functions supported by the first physical layer (e.g., the upper physical layer (High-PHY)).

Detailed structure and operation of the first physical layer processor 240 will be described later with reference to FIGS. 3 and 5.

Figure 3:
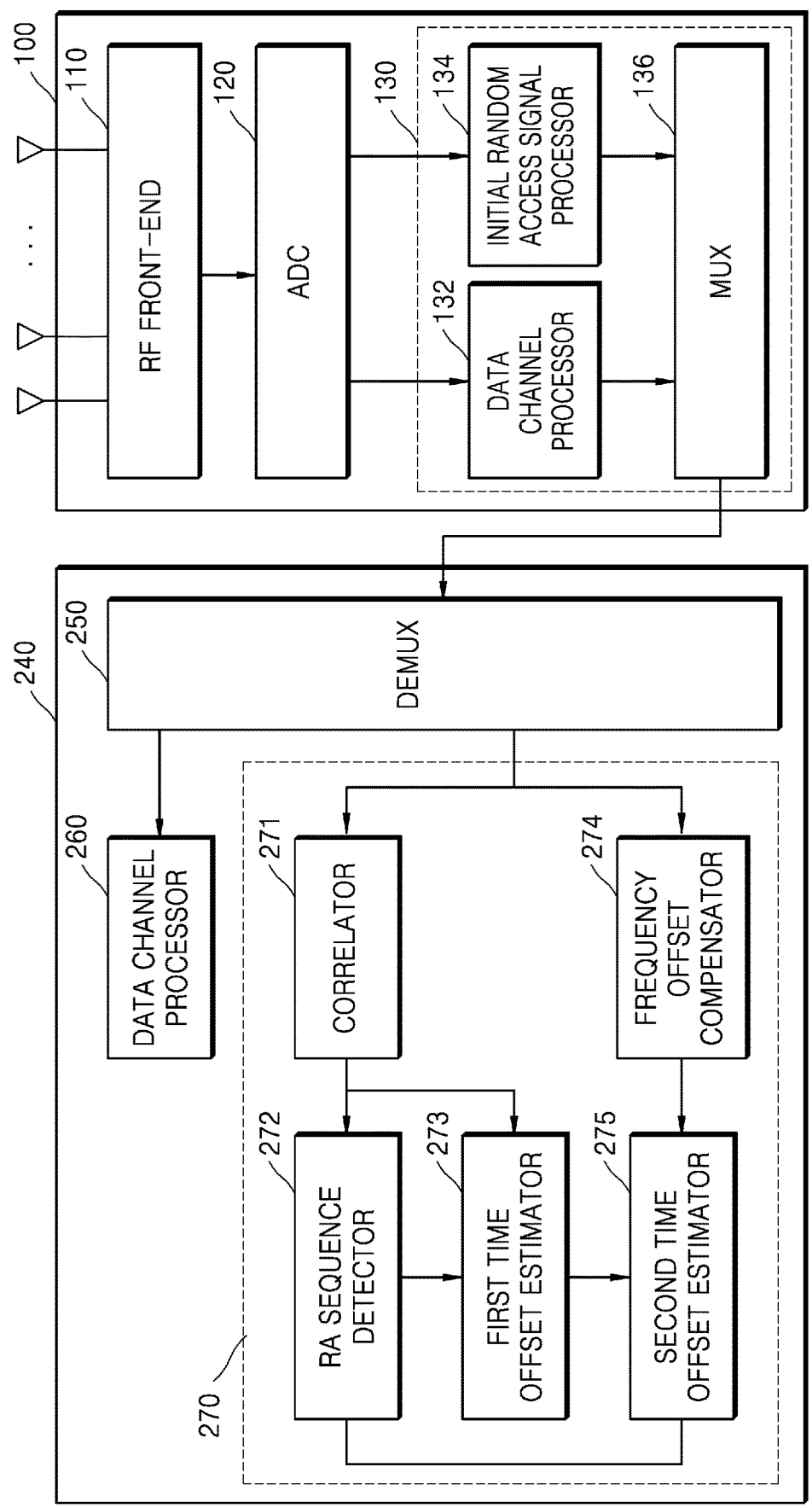
FIG. 3 is a block diagram of a first physical layer processor and a remote unit of the distributed unit shown in FIG. 1.
Figure 4:
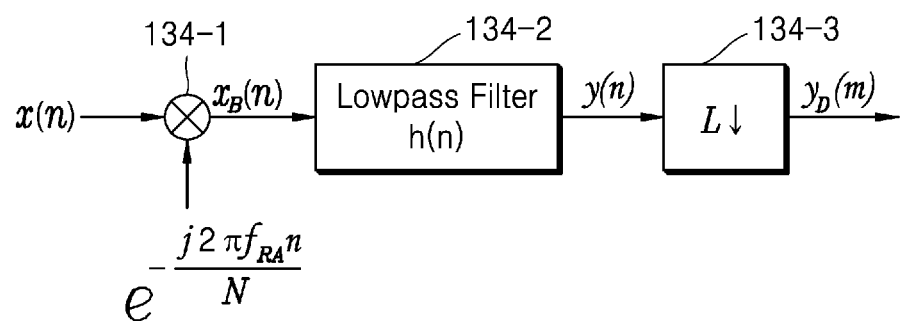
FIG. 4 is an embodiment of an initial random access signal processor included in a second physical layer processor shown in FIG. 3.

FIG. 3 is a block diagram of a first physical layer processor and a remote unit of the distributed unit shown in FIG. 1. FIG. 4 is an embodiment of an initial random access signal processor included in a second physical layer processor shown in FIG. 3. FIG. 5 is an embodiment of an initial random access signal included in an uplink signal. FIG. 6 is an embodiment of a time synchronization error detector included in the first physical layer processor shown in FIG. 3.

Referring to FIGS. 1 to 3, the remote unit 100 may include an RF front-end 110, an analog-to-digital converter (ADC) 120, and a second physical layer processor 130.

The remote unit 100 may convert an uplink signal of an RF band received through an antenna into a baseband signal through the RF front-end 110.

The ADC 120 may convert an analog baseband signal converted by the RF front-end 110 into a digital signal.

The ADC 120 may transmit the converted digital signal to the second physical layer processor 130.

The second physical layer processor 130 may include a data channel processor 132, an initial random access signal processor 134, and a multiplexer (MUX) 136.

The second physical layer processor 130 may process a portion of a physical layer (e.g., the lower physical layer (low-PHY)) divided in the communication system 10 using physical layer division.

The data channel processor 132 may process a data channel of a digitally converted uplink signal. According to an embodiment, the data channel processor 132 may perform processing such as cyclic prefix (CP) removal, discrete Fourier transform (DFT), and data compression on the uplink signal.

The initial random access signal processor 134 may extract an initial random access signal from the digitally converted uplink signal and reduce a data amount of the extracted initial random access signal.

According to an embodiment, the initial random access signal may be a Physical Random Access Channel (PRACH) signal.

Referring to FIG. 4 together, the initial random access signal processor 134 may include a mixer 134-1, a low pass filter 134-2, and a down sampler 134-3.

The mixer 134-1 may receive an uplink signal x(n) that is digitally converted and transmitted by the ADC 120, and may shift a frequency band of the received uplink signal x(n) to the baseband.

The input signal x(n) and an output signal xb(n) input/output by the mixer 134-1 may be expressed by the relationship of Equation 1 below.

$$x_B(n) = x(n)e^{-\frac{j2\pi f_{RA} n}{N}} \quad \text{(Equation 1)}$$

(where N is a DFT size when using orthogonal frequency division multiplexing (OFDM), and n is a time index of a sample)

Figure 5:
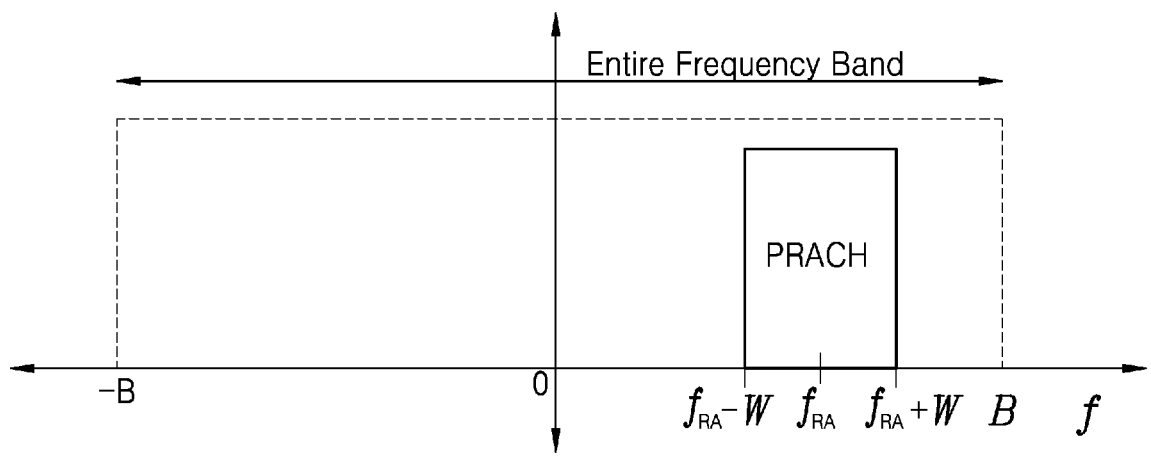
FIG. 5 is an embodiment of an initial random access signal included in an uplink signal.
Figure 6:
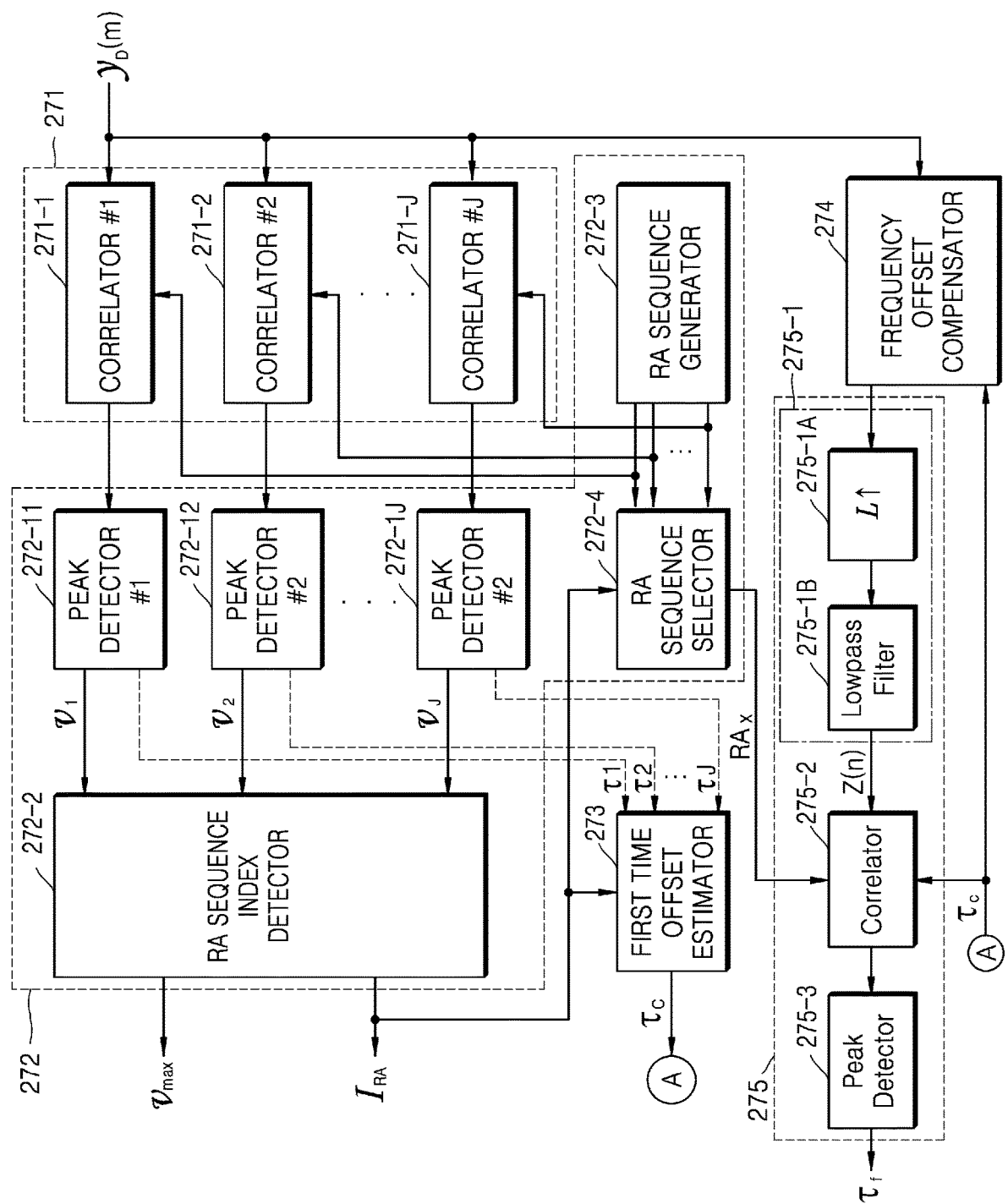
FIG. 6 is an embodiment of a time synchronization error detector included in the first physical layer processor shown in FIG. 3.

Referring to FIG. 5 together, in an uplink signal, a frequency band in which an initial random access signal (e.g., a PRACH signal) is located is shown, a center frequency is $f_{RA}$, and a bandwidth from the center frequency to both ends of the frequency band is denoted by W.

The mixer 134-1 may frequency shift the uplink signal (e.g., the PRACH signal) so that the center frequency of the initial random access signal becomes zero.

The low-pass filter 134-2 may perform low-pass filtering so that only the frequency band in which the initial random access signal (e.g., the PRACH signal) exists in the uplink signal in which the frequency band is shifted to a baseband by the mixer 134-1 passes through.

The low-pass filter 134-2 may extract only the initial random access signal (e.g., the PRACH signal) from the uplink signal through the low-pass filtering and output the initial random access signal as an output signal y(n).

In this case, the output signal y(n) may be expressed as in Equation 2 below.

$$y(n) = \sum_{m=0}^{N_{LPF}-1} h(m)x_B(n-m) \quad \text{(Equation 2)}$$

(where h(n) is an impulse response of the low-pass filter 134-2, and $N_{LPF}$ is the number of taps of the low-pass filter 134-2)

According to an embodiment, a range of a pass band of the low pass filter 134-2 may be set according to a frequency range of the initial random access signal (e.g., the PRACH signal) frequency shifted to a baseband.

Returning to FIG. 4, the down-sampler 134-3 downsamples the output signal y(n) filtered by the low-pass filter 134-2 to output an initial random access signal $y_D(m)$ with a reduced amount of data.

According to an embodiment, the down-sampler 134-3 may downsample the output signal y(n) filtered by the low-pass filter 134-2 by L times and output the output signal y(n). In this case, the output signal may be expressed as in Equation 3 below.

$$y_D(m)=y(mL+\alpha) \qquad \text{(Equation 3)}$$

(where m is an integer indicating a time index after downsampling, L is an integer satisfying 1≤L≥/W, and α is an integer value satisfying 1≥α≥L−1, which is a downsampling offset)

According to an embodiment, the down sampler 134-3 may be modified to reduce the amount of data in various ways (e.g., a compressor for compressing data, etc.).

Returning to FIG. 3, the multiplexer 136 may combine an uplink signal processed and output by the data channel processor 132 and an initial random access signal extracted by the initial random access signal processor 134 to reduce the amount of data to generate a combined signal, and may output the generated combined signal.

According to an embodiment, the multiplexer 136 may combine the uplink signal processed and output by the data channel processor 132 and the initial random access signal extracted by the initial random access signal processor 134 to reduce the amount of data into a single data stream.

The multiplexer 136 may transmit the combined signal to the first physical layer processor 240.

The first physical layer processor 240 may include a demultiplexer (DEMUX) 250, a data channel processor 260, and a time synchronization error detector 270.

The demultiplexer 250 may separate an initial random access signal with a reduced amount of data from the combined signal transmitted from the multiplexer 136 of the second physical layer processor 130.

The demultiplexer 250 may transmit the uplink signal that has been processed and output by the data channel processor 132 of the second physical layer processor 130 to the data channel processor 260 of the first physical layer processor 240, and the initial random access signal with a reduced amount of data may be transmitted to the time synchronization error detector 270.

The data channel processor 260 may receive the uplink signal that has been processed and output by the data channel processor 132 of the second physical layer processor 130 to perform data channel processing in the first physical layer.

According to an embodiment, the data channel processor 260 may perform various processes such as demodulation, demapping, and data decompression on the uplink signal.

The time synchronization error detector 270 may include a correlator 271, a random access (RA) sequence detector 272, a first time offset estimator 273, a frequency offset compensator 274, and a second time offset estimator 275.

The correlator 271 may calculate a correlation value between a plurality of initial random access signals with a reduced amount of data and a plurality of random access sequences.

The random access sequence detector 272 may search for a random access sequence having a maximum correlation value from among the plurality of random access sequences, and may output information about the maximum correlation value and a random access sequence corresponding thereto (e.g., an index) according to a search result.

The first time offset estimator 273 may calculate a first time offset using a random access sequence having the maximum correlation value.

The frequency offset compensator 274 may estimate a frequency offset of a received initial random access signal and compensate the estimated frequency offset to output an initial random access signal in which the frequency offset is compensated.

The second time offset estimator 275 may calculate the first time offset output by the first time offset estimator 273, a restored initial random access signal obtained by restoring the initial random access signal with a reduced amount of data, and a second time offset using the random access sequence having the maximum correlation value.

For description of the detailed structure and operation of the time synchronization error detector 270, referring to FIG. 6, the correlator 271 may include a plurality of correlators 271-1 to 271-J.

Each of the plurality of correlators 271-1 to 271-J (where J is an integer of 2 or more) may calculate and output a correlation value between each of a plurality of random access sequences generated by a random access sequence generator 272-3 and the initial random access signal $y_D(m)$ with a reduced amount of data.

The random access sequence detector 272 may include a plurality of peak detectors 272-11 to 272-1J, a random access sequence index detector 272-2, the random access sequence generator 272-3, and a random access sequence selector 272-4.

The plurality of peak detectors 272-11 to 272-1J may detect and output maximum correlation values V1 to VJ from correlation values output from the plurality of correlators 271-1 to 271-J, respectively.

The plurality of peak detectors 272-11 to 272-1J may detect and output time values $\tau_1$ to $\tau_J$ with respect to points corresponding to the maximum correlation values V1 to VJ from the correlation values output from the plurality of correlators 271-1 to 271-J, respectively.

The random access sequence index detector 272-2 may detect a largest correlation value Vmax from among the maximum correlation values V1 to VJ by using the maximum correlation values V1 to VJ respectively output from the plurality of peak detectors 272-11 to 272-1J, and output an index value $I_{RA}$ of a random access sequence corresponding to the largest correlation value Vmax.

The random access sequence generator 272-3 may generate and output a plurality of random access sequences that are candidates.

The random access sequence selector 272-4 may select and output a random access sequence corresponding to the index value $I_{RA}$ of the random access sequence having the largest correlation value Vmax from among the plurality of random access sequences generated by the sequence generator 272-3.

The first time offset estimator 273 may receive the time values $\tau_1$ to $\tau_J$ from the plurality of peak detectors 272-11 to 272-1J, receive the index value $I_{RA}$ from the random access sequence index detector 272-2, and calculate the time value $\tau_c$ corresponding to the index value $I_{RA}$ from among the time values $\tau_1$ to $\tau_J$ as the first time offset.

The frequency offset compensator 274 may estimate and compensate the frequency offset using the first time offset $\tau_c$ calculated by the first time offset estimator 273 and a repetition characteristic of an initial random access signal (e.g., the PRACH signal) in a time domain.

The second time offset estimator 275 may include a signal restorer 275-1, a correlator 275-2, and a peak detector 275-3.

The signal restorer 275-1 may include an up-sampler 275-1A and a low-pass filter 275-1B.

The up-sampler 275-1A may upsample an initial random access signal with a reduced amount of data.

According to an embodiment, the up-sampler 275-1A may perform upsampling by L times corresponding to a multiple of reducing a data amount of the initial random access signal in a second physical layer.

The low-pass filter 275-1B may perform interpolation processing on the upsampled initial random access signal by low-pass filtering the upsampled initial random access signal.

According to an embodiment, an interpolated signal in the time domain may be obtained by performing low-pass filtering on the upsampled initial random access signal after converting the upsampled initial random access signal to a frequency domain using N-point DFT before the low-pass filtering of the low-pass filter 275-1B, and applying the N-point IDFT to the low-pass filtered signal.

According to an embodiment, an interpolation method of the upsampled initial random access signal may be variously modified, such as nearest neighbor interpolation, linear interpolation, quadratic interpolation, cubic interpolation, and cubic interpolation for each section.

An initial random access signal with a reduced amount of data through processing of the up-sampler 275-1A and the low-pass filter 275-1B may be restored to the initial random access signal with the original amount of data.

The correlator 275-2 and the peak detector 275-3 may calculate the second time offset based on the first time offset $\tau_c$, a restored initial random access signal z(n), and a random access sequence $RA_X$ having a maximum correlation value.

The correlator 275-2 may calculate and output a correlation value of the restored initial random access signal z(n) and the random access sequence $RA_X$ having the maximum correlation value within a reference range from the first time offset $\tau_c$.

According to an embodiment, the reference range may be defined as in Equation 4 below.

$$\tau_c - T_L \leq \tau \leq \tau_c + T_R \quad \text{(Equation 4)}$$

(where the $T_L$ is a reference range of time fluctuation in the left direction, and the $T_R$ is a reference range of time fluctuation in the right direction)

The peak detector 275-3 may calculate the second time offset based on a point at which a correlation value of the correlator 275-2 becomes maximum within the reference range.

According to an embodiment, the first time offset may have a meaning as a rough time synchronization error because an initial random access signal with a reduced amount of data is used, and the second time offset may have a meaning as a precise time synchronization error because an initial random access signal with the original amount of data restored is used. According to an embodiment, a time synchronization error in the present specification may be the first time offset or the second time offset.

Figure 7:
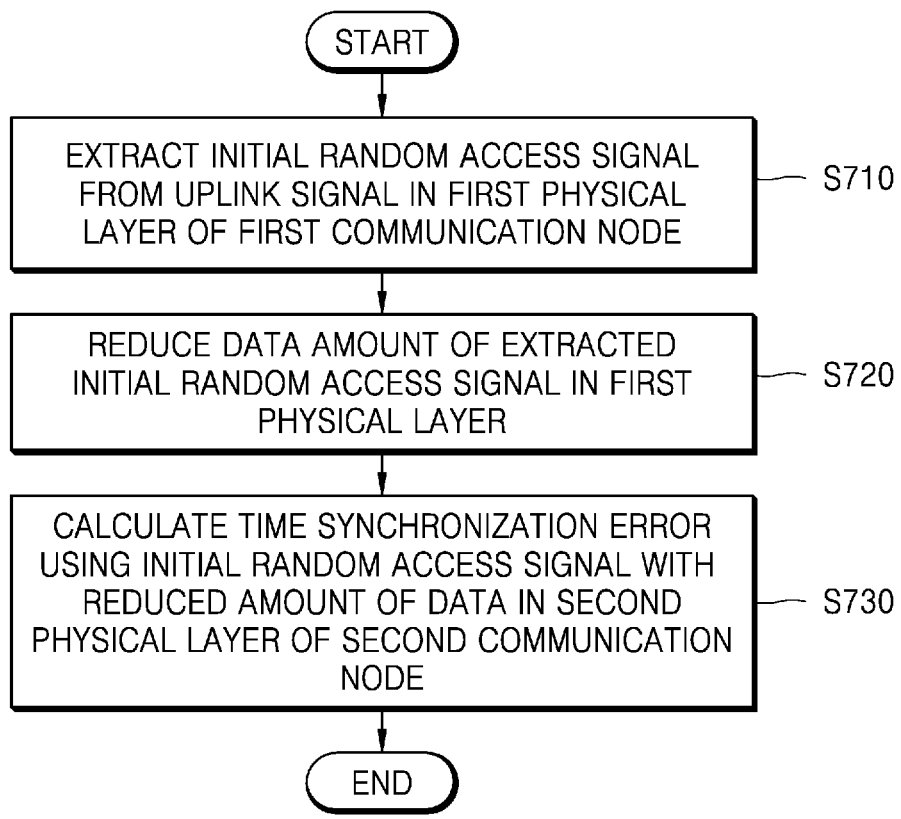
FIG. 7 is a flowchart illustrating a method of operating a communication system according to an embodiment of the present invention.

FIG. 7 is a flowchart illustrating a method of operating a communication system according to an embodiment of the present invention.

Referring to FIGS. 1 to 7, in operation S710, the communication system 10 may extract an initial random access signal from an uplink signal in a first physical layer (e.g., the lower physical layer (low-PHY)) of a first communication node (e.g., the remote unit 100).

According to an embodiment, the communication system 10 may extract the initial random access signal by performing low-pass filtering after frequency-shifting the uplink signal.

According to an embodiment, the initial random access signal may be a PRACH signal.

In operation S720, the communication system 10 may reduce a data amount of the extracted initial random access signal in the first physical layer (e.g., the lower physical layer (low-PHY)).

According to an embodiment, the communication system 10 may reduce the amount of data by downsampling the extracted initial random access signal.

In operation S730, the communication system 10 may calculate a time synchronization error using the initial random access signal with a reduced amount of data in the second physical layer (e.g., the upper physical layer (high-PHY)) of a second communication node (e.g., the distributed unit 200).

According to an embodiment, the communication system 10 may obtain a first time offset using the initial random access signal with a reduced amount of data, and may obtain a second time offset using the first time offset and an initial random access signal with the original amount of data restored.

According to an embodiment, the time synchronization error calculated by the communication system 10 may mean the first time offset or the second time offset. While the present disclosure has been particularly shown and described with reference to embodiments thereof, it will be understood that various changes in form and details may be made therein without departing from the scope of the following claims.

The invention claimed is:

1. A method of operating a communication system using physical layer division, the method comprising:
   extracting an initial random access signal from an uplink signal, in a first physical layer of a first communication node of the communication system;
   reducing a data amount of the extracted initial random access signal in the first physical layer;
   transmitting the initial random access signal with the reduced amount of data from the first communication node to a second communication node of the communication system; and
   calculating a time synchronization error between the first communication node and the second communication node using the initial random access signal with the reduced amount of data, in a second physical layer of the second communication node,
   wherein the calculating of the time synchronization error comprises:
   calculating a first time offset using the initial random access signal with the reduced amount of data;
   restoring the initial random access signal with an original amount of data by using the initial random access signal with the reduced amount of data;

calculating correlation values between the initial random access signal with the reduced amount of data and a plurality of random access sequences;

searching for a random access sequence having a maximum correlation value, among the calculated correlation values, from among the plurality of random access sequences; and calculating a second time offset as the time synchronization error based on a point at which a correlation value of the restored initial random access signal and the random access sequence having the maximum correlation value becomes maximum within a reference range from the first time offset.

2. The method of claim 1, wherein the first physical layer is a lower physical layer according to the physical layer division, and the second physical layer is an upper physical layer according to the physical layer division.

3. The method of claim 1, wherein the initial random access signal is a physical random access channel (PRACH) signal.

4. The method of claim 1, wherein the first communication node is a remote unit, and the second communication node is a distributed unit.

5. The method of claim 1, wherein the extracting of the initial random access signal from the uplink signal comprises:

shifting a frequency band of the uplink signal to a baseband; and extracting the initial random access signal by low-pass filtering the frequency band-shifted uplink signal.

6. The method of claim 1, wherein the reducing of the data amount of the extracted initial random access signal comprises:

downsampling the extracted initial random access signal to reduce the data amount of the initial random access signal.

7. The method of claim 1, further comprising:

transmitting a combined signal generated by combining the uplink signal through data channel processing of the first physical layer in the first communication node and the initial random access signal with the reduced amount of data to the second communication node, and the calculating of the time synchronization error comprises:

separating, by the second communication node, the initial random access signal with the reduced amount of data from the combined signal; and calculating, by the second communication node, the initial time synchronization error using the separated initial random access signal with the reduced amount of data.

8. The method of claim 1, wherein the restoring of the initial random access signal with the original amount of data comprises:

upsampling the initial random access signal with the reduced amount of data; and interpolating the upsampled initial random access signal.

9. The method of claim 8, wherein the interpolating of the upsampled initial random access signal comprises:

low-pass filtering the upsampled initial random access signal.

10. A communication node including a memory and a processor, wherein the communication node receives an initial random access signal with a reduced amount of data extracted from an uplink signal from another communication node, and calculates a time synchronization error between the communication node and the another communication node using the initial random access signal with the reduced amount of data in a physical layer of the communication node, wherein the communication node is configured to:

calculate a first time offset using the initial random access signal with the reduced amount of data;

restore the initial random access signal with an original amount of data by using the initial random access signal with the reduced amount of data;

calculate correlation values between the initial random access signal with the reduced amount of data and a plurality of random access sequences;

search for a random access sequence having a maximum correlation value, among the calculated correlation values, from among the plurality of random access sequences; and calculate a second time offset as the time synchronization error based on a point at which a correlation value of the restored initial random access signal and the random access sequence having the maximum correlation value becomes maximum within a reference range from the first time offset.

11. A communication system using physical layer division, the communication system comprising:

a first communication node configured to extract an initial random access signal from an uplink signal and reduce a data amount of the extracted initial random access signal in a first physical layer, and transmit an initial random access signal with the reduced amount of data to a second communication node; and the second communication node configured to calculate a time synchronization error between the first communication node and the second communication node using the initial random access signal with the reduced amount of data in a second physical layer, wherein the second communication node is configured to:

calculate a first time offset using the initial random access signal with the reduced amount of data;

restore the initial random access signal with an original amount of data by using the initial random access signal with the reduced amount of data;

calculate correlation values between the initial random access signal with the reduced amount of data and a plurality of random access sequences;

search for a random access sequence having a maximum correlation value, among the calculated correlation values, from among the plurality of random access sequences; and calculate a second time offset as the time synchronization error based on a point at which a correlation value of the restored initial random access signal and the random access sequence having the maximum correlation value becomes maximum within a reference range from the first time offset.

* * * * *